Figure 5:
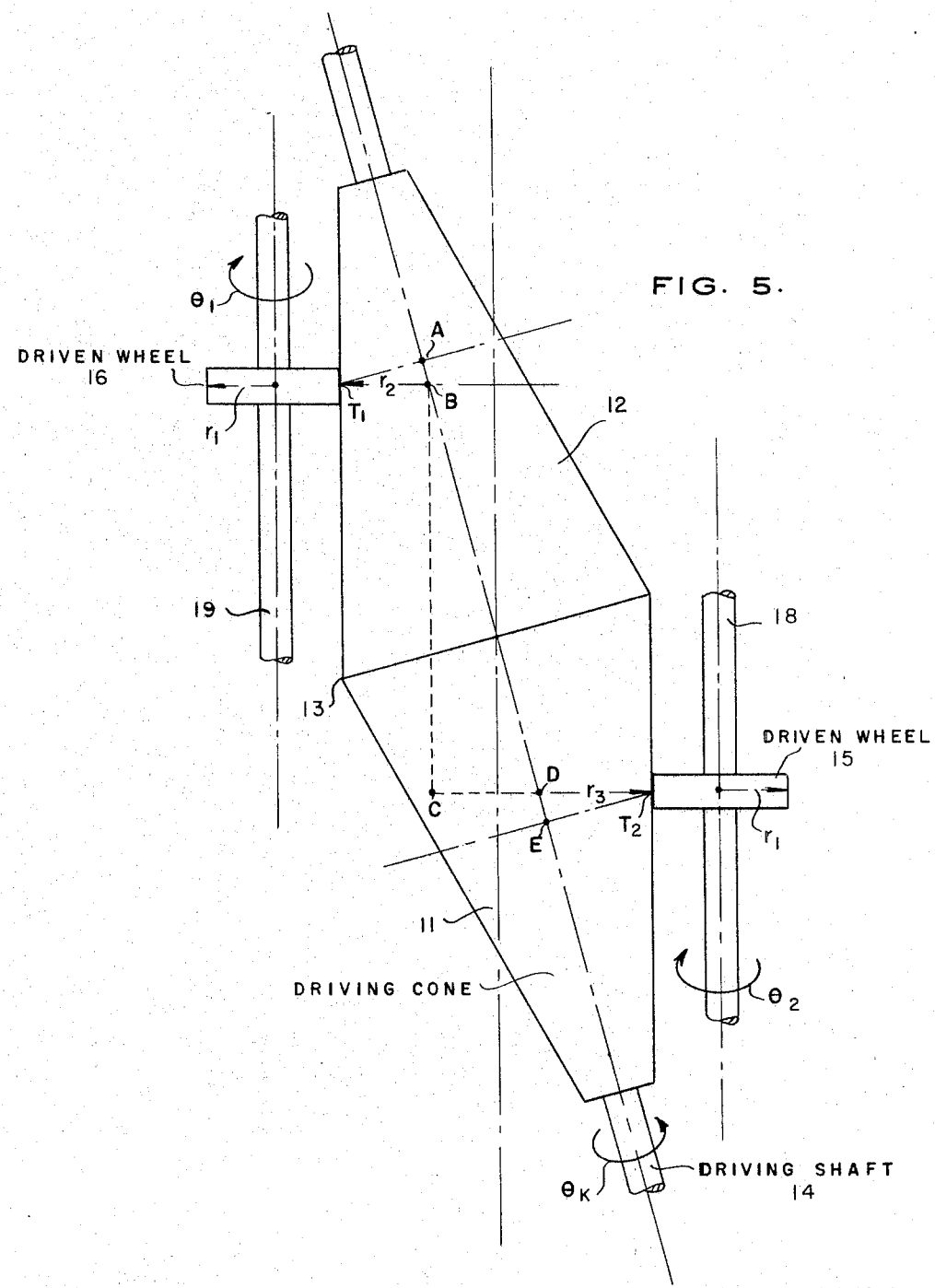

Jan. 17, 1967  J. D. LEA  3,298,238
PROPORTIONING TRANSMISSION
Filed Feb. 18, 1965  3 Sheets-Sheet 1
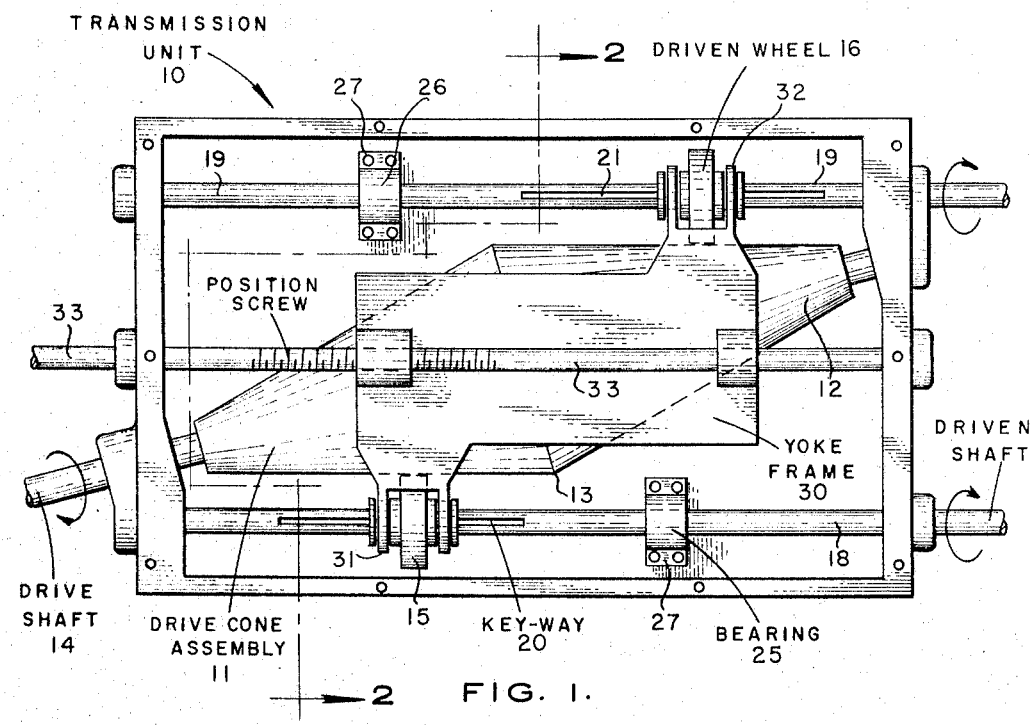
FIG. 1.
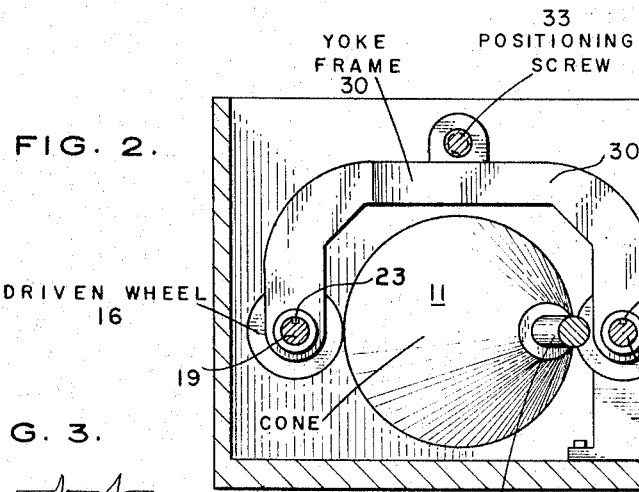
FIG. 2.
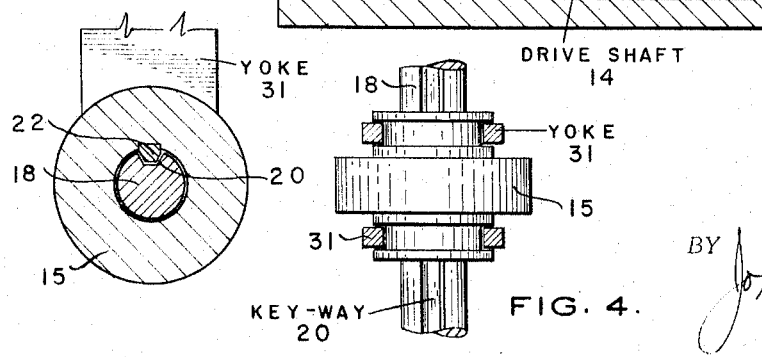
FIG. 3.
FIG. 4.
INVENTOR.
JAMES D. LEA,
BY John S. Schneider
ATTORNEY.

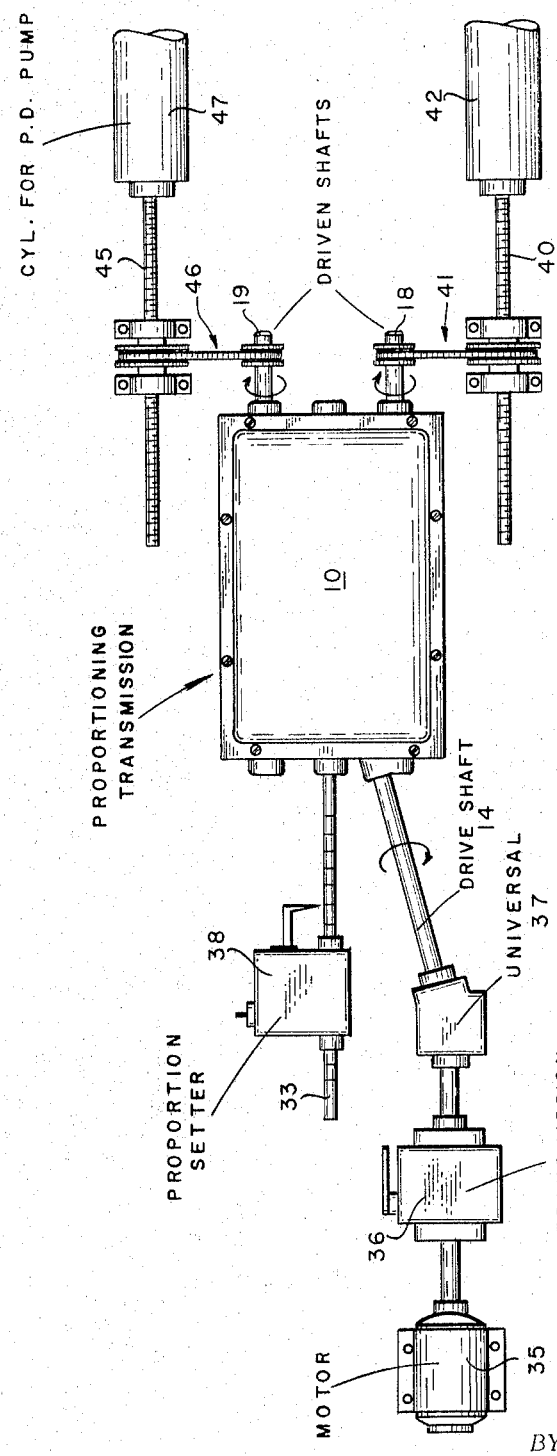

United States Patent Office 3,298,238
Patented Jan. 17, 1967

3,298,238
PROPORTIONING TRANSMISSION
James D. Lea, Houston, Tex., assignor, by mesne assignments, to Esso Production Research Company, Houston, Tex., a corporation of Delaware
Filed Feb. 18, 1965, Ser. No. 433,590
7 Claims. (Cl. 74—191)

The present invention concerns a friction drive transmission capable of varying the ratio of the speeds of rotation of at least two driven output shafts while maintaining the sum of the speeds of rotation of these shafts constant.

The mechanism for driving the output shafts comprises two identical conical frustums mounted base-to-base on a common shaft. Two driven wheels of equal radii are attached to the rotatable output shafts. Each wheel is slidable along the shaft to which it is attached, but it cannot rotate without rotating the shaft. The two wheels contact the two opposing parallel sides of the cones and are arranged such that a translation of one wheel along its axle or shaft in one direction results in a translation of the other wheel along its axle the same amount and in the same direction. A power source drives the common shaft of the cones and, in turn, the cones rotate the output shafts at speeds dependent on the position of the wheels on the cones. Adjustment means is provided for positioning the wheels along their axles.

The transmission system of the invention has varied applications. For example, it may be used in laboratory apparatus when it is desired to pump with constant displacement pumps using one power source, fluid from two different chambers where it is desired to maintain a constant, total exit fluid rate from the chambers while varying the ratio of the output rates of the two chambers. The transmission is usable in any application where accurate, constant reproducible metering of two or more phases is required. The transmission system has utility where it is desired to add small amounts of materials to a flowing stream over an extended time, as when corrosion inhibitors are added to oil wells, emulsion breakers to treating tanks, chemicals to drilling mud, additives to fuels, etc. More uniform distribution in the stream results if the small amount of additive is mixed with a larger amount of diluent prior to adding it to the flowing stream.

Thus, a primary object of the present invention is to provide apparatus capable of driving at least two shafts at different speeds while retaining a constant speed sum of the shafts' speeds. Another object of this invention is to utilize such transmissions for adding amounts of materials to a flowing stream.

The above objects and other objects and advantages of the invention will be apparent from a more detailed description thereof when taken with the drawings wherein:

FIG. 1 is a side view of the transmission unit;
FIG. 2 is a view taken along lines 2—2 of FIG. 1;
FIG. 3 is an enlarged view of one of the wheel and shaft connections illustrated in FIG. 2;
FIG. 4 is another (top) view of the wheel and shaft and yoke connections shown in FIGS. 2 and 3;
FIG. 5 is a schematic view of the details of the transmission unit; and
FIG. 6 illustrates schematically the components of a complete pumping system with which the transmission unit of FIGS. 1 to 5 can be used.

Referring to the drawings in greater detail, in FIGS. 1 to 4 is shown a housing 10 in which are positioned two identical cones 11 and 12 mounted base-to-base as at 13 on a common shaft 14. Two driven wheels 15 and 16 of equal radii are mounted for slidable movement along driving shafts 18 and 19, respectively. Shafts 18 and 19 are provided with keyways or slots 20 and 21, respectively. A key 22, attached to wheel 15, and a key 23, attached to wheel 16, engage keyways 20 and 21, respectively. Any standard keying means is suitable so long as clearances are sufficient to allow free movement of the wheels along the shafts. Shafts 18 and 19 are additionally supported by bearings 25 and 26, respectively. Each bearing is mounted on a bearing base 27 (FIG. 2). A yoke frame 30 is attached to driven wheels 15 and 16 by means of yokes 31 and 32, respectively. An adjusting or positioning screw 33 is connected to yoke 30 and it functions to move yoke 30 back and forth in the direction of the axis of shafts 18 and 19. Yoke frame 30 constrains driven wheels 15 and 16 to move along the shafts in proper relation to each other. Positively fixing the driven wheels 15 and 16 in this manner with respect to each other assures that the driven wheels always move in the proper direction and also by the proper amounts. In FIGS 1 and 2, the yoke adjusting screw 33 is parallel to the two driven shafts 18 and 19 and at an angle with the axis of the cone frustums. The center line of the adjusting screw could have been arranged coincident with the axis of the cone frustums since the only requirement is that the faces of the cones on which the driven wheels ride remain parallel with the driven shafts 18 and 19.

Reference is made to FIG. 5 for a mathematical analysis of the relationship between the cones and the driven wheels. In this figure, the radii of the driven wheels are designated $r_1$ and the angular rotations of the two driven shafts 18 and 19 are called $\oplus_1$, $\oplus_2$. The angle of rotation of the driving shaft is called $\oplus_k$. The radii from the cone axes to the points of frictional contact are $AT_1$ and $ET_2$.

Thus $$\text{angle } ABT_1 = \text{angle } EDT_2$$

and, if $\overline{BC}$ = constant for any wheel positions (by their constraint), then $$\text{angle } ABT_1 = \text{angle } EDT_2 = \text{constant}$$
$$\sin \text{ angle } ABT_1 = \text{constant}$$
$$BT_1 + DT_2 = \text{constant}$$
$$BT_1 + DT_2 = \frac{AT_1}{\text{Constant}} + \frac{ET_2}{\text{Constant}} =$$
$$K_2(AT_1 + ET_2) = \text{constant}$$

The sum of the cone radii is then constant. For rolling contact without slipping $$r_1 \oplus_1 = (AT_1) \oplus_k$$
$$r_1 \oplus_2 = (ET_2) \oplus_k$$

Then $$\frac{d\oplus_1}{dt} = \frac{AT_1}{r_1} \frac{d\oplus_k}{dt} \qquad \frac{d\oplus_2}{dt} = \frac{ET_2}{r_1} \frac{d\oplus_k}{dt}$$

$$\frac{d\oplus_1}{dt} + \frac{d\oplus_2}{dt} = \frac{1}{r_1} \frac{d\oplus_k}{dt}(AT_1 + ET_2)$$

$$\frac{d\oplus_1}{dt} + \frac{d\oplus_2}{dt} = \frac{d\oplus_k}{dt} \cdot \text{A constant}$$

And $$\frac{\frac{d\oplus_1}{dt}}{\frac{d\oplus_2}{dt}} = \frac{AT_1}{ET_2}$$

In FIG. 6 a layout of the components of a complete pumping system is illustrated. A conventional, electrical motor 35 is used to drive shaft 14 through the speed setting transmission 36 and the universal 37. A proportion setter 38 is mounted on position screw 33, as shown. The proportioning transmission unit is enclosed in housing 10. Driven shaft 18 is connected to a threaded shaft (worm gear) 40 through the threaded pulley and belt system 41. Shaft 40 drives a piston located in the positive displacement pump 42. Similarly, driven shaft 19 is connected to a threaded shaft 45 through the threaded pulley and belt system 46. Shaft 45 drives a piston arranged in the positive displacement pump 47. The ratio of the amounts per unit time pumped by the positive displacement pumps may be changed with proportion setter 38. Also, the total quantity pumped from both pumps per unit time may be changed by the speed setting transmission 36. Any positive displacement pump is suitable for use with this system, for example, gear pumps and helical screw pumps or even reciprocating piston pumps. One typical pump that may be used is a piston displacement type such as manufactured by the Ruska Instrument Corp., Houston, Texas. This pump is designed for low volume, high pressure work often encountered in laboratory use.

Having fully described the apparatus, objects, advantages and operation of my invention, I claim:

1. Transmission apparatus adapted to drive at least two output shafts at different speeds while retaining a constant speed sum comprising:
   a first driven wheel mounted on one of said output shafts;
   a second driven wheel mounted on another of said output shafts; and
   first and second identical conical frustums mounted base-to-base on a common shaft in a manner such that the surfaces of the first and second cones are parallel to and in contact with said first and second wheels.

2. Transmission apparatus adapted to drive at least two output shafts at different speeds while retaining a constant speed sum comprising:
   a first driven means mounted on one of said output shafts;
   a second driven means mounted on another of said output shafts;
   first and second identical conical frustums mounted base-to-base on a common shaft in a manner such that the surfaces of the first and second cones are parallel to and in contact with said first and second driven means, respectively; and
   adjustment means adapted to position said driven means along the lengths of said shafts.

3. Transmission apparatus adapted to drive at least two output shafts at different speeds while retaining a constant speed sum comprising:
   a first driven wheel mounted on one of said output shafts;
   a second driven wheel mounted on another of said output shafts;
   first and second identical conical frustums mounted base-to-base on a common shaft in a manner such that the surfaces of the first and second cones are parallel to and in contact with said first and second wheels, respectively;
   power means adapted to drive said common shaft; and
   wheel adjustment means adapted to position said wheels along the lengths of said shafts.

4. Apparatus as recited in claim 3 including a first positive displacement pump connected to said one output shaft and a second positive displacement pump connected to said other output shaft.

5. Transmission apparatus capable of varying the ratio of the speeds of rotation of at least two output shafts while maintaining the sum of the speeds of rotation of these shafts constant comprising:
   first wheel means mounted for slidable movement on one of said output shafts;
   second wheel means mounted for slidable movement on another of said output shafts;
   first and second identical cones mounted base-to-base on a common shaft;
   said first and second cones being parallel to and in contact with said first and second wheel means, respectively;
   power means adapted to rotate said common shaft and thereby said first and second cones; and
   wheel adjustment means adapted to position said first and second wheel means along the lengths of said shafts.

6. Apparatus as recited in claim 5 including a first positive displacement pump connected to said one output shaft and a second positive displacement pump connected to said other output shaft.

7. Transmission apparatus for pumping materials at different rates in which at least two pumps are operated at different speeds while retaining a constant speed sum comprising:
   a first output shaft connected to one of said pumps adapted to operate it;
   a second output shaft connected to said other pump adapted to operate it;
   a first wheel means mounted on and slidably movable along said first output shaft;
   a second wheel means mounted on and slidably movable along said second output shaft;
   first and second identical cones mounted base-to-base on a common shaft in a manner such that the surfaces of said first and second cones are parallel to and in contact with said first and second wheel means, respectively;
   power means adapted to rotate said common shaft and thereby said first and second cones and said first and second wheel means and said first and second output shafts; and
   wheel adjustment means adapted to position said wheel means along the lengths of said shafts.

References Cited by the Examiner

UNITED STATES PATENTS 1,431,649   10/1922   Gillette _____ 74—191

DAVID J. WILLIAMOWSKY, *Primary Examiner*,

L. H. GERIN, *Assistant Examiner*.